Jan. 3, 1956

R. T. NORMENT ET AL 2,729,331

MOBILE MAGNET

Filed June 24, 1952

INVENTORS:
ROBERT T. NORMENT
FRANK DERTINGER
BY GOLON BARNEY HARRIS

Norman N. Holland
ATTORNEY

Jan. 3, 1956

R. T. NORMENT ET AL 2,729,331

MOBILE MAGNET

Filed June 24, 1952

INVENTORS:
ROBERT T. NORMENT
FRANK DERTINGER
BY GOLON BARNEY HARRIS

Norman T. Holland
ATTORNEY

Jan. 3, 1956

R. T. NORMENT ET AL

2,729,331

MOBILE MAGNET

Filed June 24, 1952

INVENTORS:
ROBERT T. NORMENT
FRANK DERTINGER
BY GOLON BARNEY HARRIS

Norman R. Holland
ATTORNEY

Jan. 3, 1956

R. T. NORMENT ET AL 2,729,331

MOBILE MAGNET

Filed June 24, 1952

INVENTORS:
ROBERT T. NORMENT
FRANK DERTINGER
BY GOLON BARNEY HARRIS

Norman N. Holland
ATTORNEY

United States Patent Office 2,729,331
Patented Jan. 3, 1956

2,729,331

MOBILE MAGNET

Robert T. Norment, New York, and Frank Dertinger, Flushing, N. Y., and Golon Barney Harris, Washington, D. C., assignors, by mesne assignments, to International Fermont Machinery Co., Inc., Ramapo, N. Y., a corporation of New York Application June 24, 1952, Serial No. 295,368

11 Claims. (Cl. 209—215)

The present invention relates generally to mobile means for magnetically picking up magnetic materials such as ferrous objects from roads, airport runways, etc.

Much damage is done to pneumatic tires and to vehicles or airplanes on which they are mounted, by objects such as nails, tacks, bolts, pieces of sharp metal, etc. which somehow find their way to the roads or runways over which pneumatically tired vehicles travel. Such objects may penetrate the tire and cause slow leaks, or tear them open abruptly so as to cause "blowouts" which throw the vehicle out of control and frequently wreck it.

As the number of vehicles in use increases so does the number of extraneous damaging objects increase, probably due to parts of vehicles themselves becoming loose and dropping to the ground and also to transported cargo items falling out of vehicles. Ever increasing travelling speeds of vehicles increases the possibility of seriously damaging the vehicle or injuring its personnel, as blowouts and punctures at high speeds are much more likely to cause the operator to lose control of the vehicle.

The great majority of extraneous tire-damaging objects are of magnetic materials and hence can be picked up passing an energized electro-magnet over them. At intervals the magnet may be de-energized so as to release the picked up objects. Previous attempts have been made to provide magnets which could be moved over the ground to pick up ferrous objects but they have left much to be desired. For example, some previous structures have been so complicated and impractical that they have never gone into commercial use. Others have had to be towed behind the rear of a truck and hence the tires of the truck itself have been exposed to the very puncture-causing objects which it is attempted to pick up. Still other previous structures have utilized magnets that could not be readily elevated for passage over rough ground or for facilitating maintenance or repair. A still further objection to previous mobile structures is that no satisfactory means was provided to firmly hold the magnet and yet allow it to yield in the event the magnet struck against a bump or high spot on the ground while traveling thereover.

The present invention aims to overcome the above and other difficulties by providing new and improved mobile magnetic means which may be readily attached to and pushed ahead of a vehicle to pick up magnetic objects. The invention further contemplates the provision of such means which embodies a magnet that may be readily adjusted vertically to vary its spacing from the ground and that may readily yield and elevate in the event it strikes a bump in the road or some relatively heavy obstruction during movement over the ground.

An object of the present invention is to provide a new and improved mobile magnet.

Another object of the invention is to provide an improved mobile magnet which is adapted to be attached to the front of a vehicle and pushed ahead of it while in operation.

Another object of the invention is to provide a mobile magnet for picking up magnetic objects which embodies improved means for supporting the magnet.

Another object of the invention is to provide a mobile magnet embodying improved means for varying spacing of the magnet from the ground.

A further object of the invention is to provide a mobile magnet in which improved means is provided for yieldably mounting the magnet so that it may shift its position in response to striking an unduly heavy object or a bump.

A still further object of the invention is to provide a mobile magnet embodying improved means for shifting the position of the magnet and for varying the position of part of the supporting structure.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Described generally the device comprises (Figs. 1–4) a frame structure 1 supported adjacent its front end on one or more wheels 2 and at its rear end by the bumper 4 of a vehicle 5 which is adapted to push the device ahead of it. The means 7 for magnetically picking objects from the ground comprises a generally channel-shaped casing 6 which contains a row of electromagnets. The entire magnet structure 7 is carried by depending arms 8 and extends crosswise of the frame structure 1 between its front and rear ends, projecting in front of the pneumatic tires 10 of the pushing vehicle 5. When the electro-magnets in the casing 7 are energized and the structure is pushed over the ground in front of the truck magnetic objects on the ground jump up to and are held against the undersurface of a bottom member, where they are held until such time as the electro-magnets are de-energized.

Current for energizing the magnet means 7 is supplied, through cables 13, from a motor generator set 14 carried by the truck 5. The motor generator set may be of any commercial type wherein an internal combustion engine is coupled to and rotates a generator.

The magnetic means 7 may be moved up and down by a hydraulic cylinder 17 operatively connected with the supporting arms 8. In the event the magnet 7 strikes against a heavy obstruction or a bump in the road while it is being moved over the ground it may move rearwardly so as to swing the arms 8 about rotatable supports 12.

The front wheels 2 are connected with the frame 1 adjacent the midportion of its front end and are mounted similarly to a caster so that they may freely swivel in response to turning or other movement of the pushing vehicle 5, and are preferably pneumatically tired to minimize transmission of shocks and jars to the present device. In operation the wheels travel along a relatively narrow zone in advance of the truck 5 and hence there is minimum danger of their being punctured or cut open.

Figure 1:
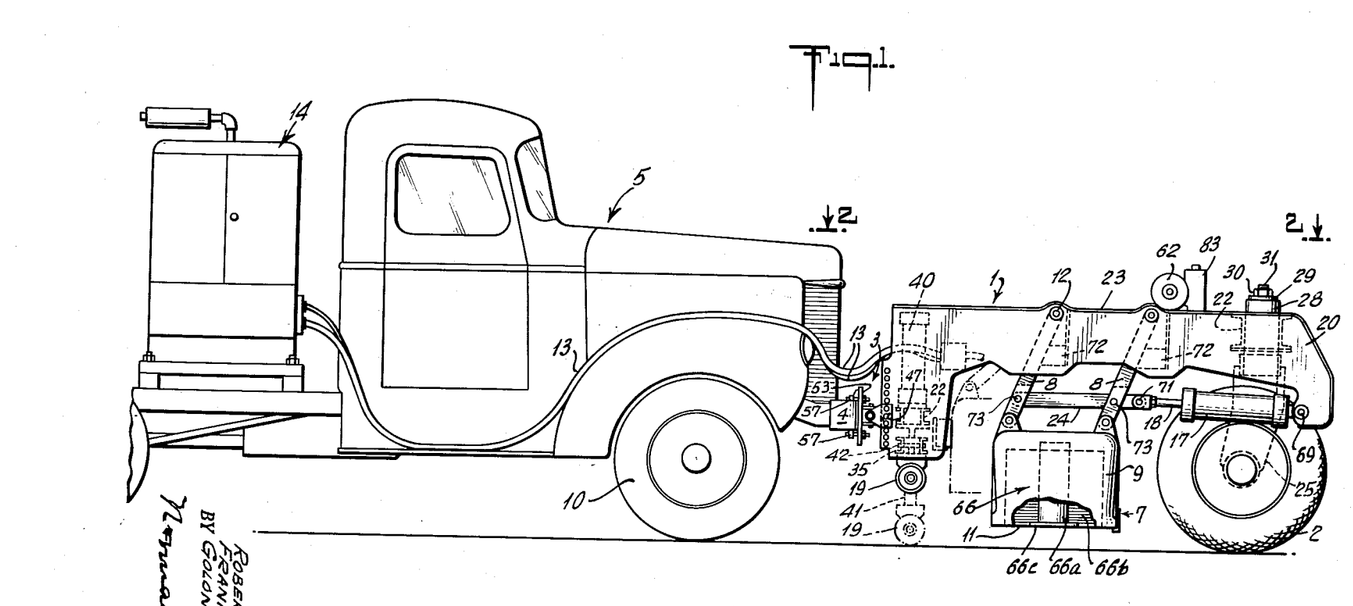
Fig. 1 is a side elevational view illustrating the present mobile magnet in its relationship to a truck that pushes it and that supports a motor-generator set.
Figure 2:
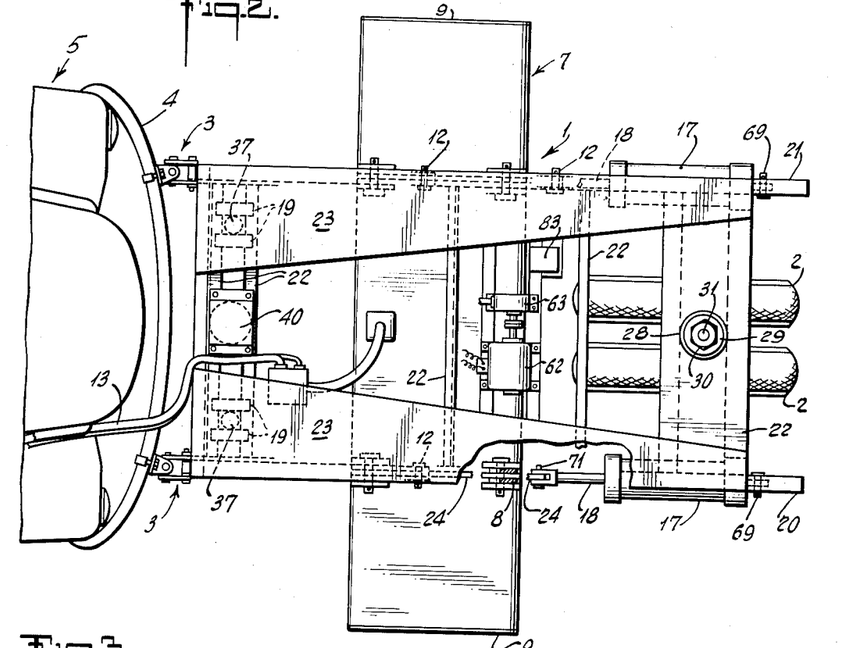
Fig. 2 is a top plan view showing the mobile magnet of Fig. 1 attached to the front portion of a truck.
Figure 3:
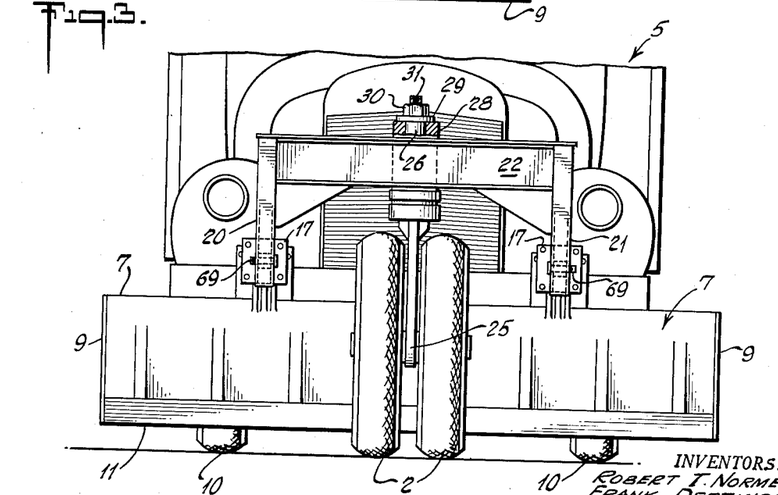
Fig. 3 is a front elevational view of the invention as disclosed in Figs. 1 and 2.
Figure 4:
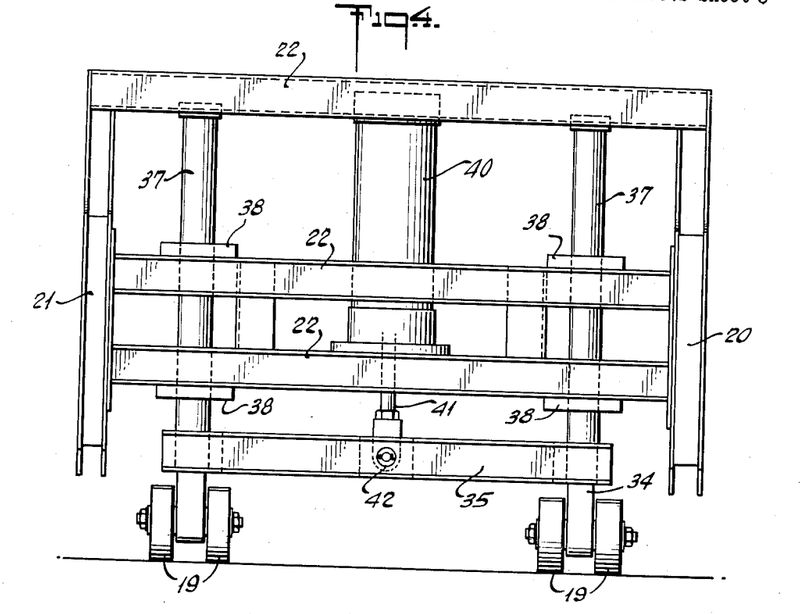
Fig. 4 is a rear view of the mobile magnet shown in Figs. 1 through 4.

When it is desired to uncouple the device from the front truck bumper 4, auxiliary wheels 10 adjacent the rear end of the frame structure 1 may be lowered to the dotted position shown in Fig. 1 so as to support the device in the general position indicated. Thereafter the coupling between the device and the bumper 4 may be readily disconnected. The auxiliary supporting wheel structure 19 may be set so as to relieve the weight of the device which is carried by the bumper coupling, to thereby facilitate uncoupling operations.

The present invention and its operation will now be described in detail.

As shown more particularly in Figs. 1–4, the frame structure is generally rectangular and comprises side members 20 and 21 secured to and held in horizontally spaced relationship with respect to each other by suitable cross members 22. Plates or other strengthening members 23 may be welded, bolted, or otherwise secured to the side members and the cross members in order to provide a sturdy, rigid construction. Any other suitable strengthening members may of course be utilized.

The means shown for supporting the front end of the frame structure 1 comprises a pair of adjacent parallel wheels 2 carried on an axle which is carried by and projects laterally from a rearwardly inclined member 25. The upper portion of the member 25 is secured to a generally upright shaft 26 that extends into a sleeve 28 which contains suitable bearings and is welded or secured in any other manner to the frame structure 1. The shaft 26 is held within the sleeve 28 by a washer 29 and nut 30 threaded onto the upper end 31 of the shaft 26. The shaft 26 is free to rotate within the sleeve 28 and its bearing surfaces in response to turning movement of the device over the ground. The rearward inclination of the mounting member 25 facilitates turning of the planes of the wheels 2 to the direction of movement of the device.

It is preferred that the pneumatic tires which support the front end of the device be of the puncture-proof type to lessen the possibility of air leaking out of them while the device is in use. In addition, each of the two tires is preferably of such size or capacity that one of them alone will support the front end of the device, in the event one tire should suffer a leak or blowout, until such time as it is convenient to replace the damaged tire.

The rear of the frame structure 1 carries and may be supported on auxiliary wheels 19 when the structure is separate from a truck. The wheels 19 are preferably elevated as shown in the full lines of Fig. 1 when the device is being pushed over the ground and may be lowered to dotted position to support the device when disconnected from a truck.

As these wheels do not support the mobile magnet during its normal use they may be of small diamter, in the neighborhood of five or six inches. For load distribution a pair of the wheels 19 is preferably provided adjacent each side of the frame structure 1, each wheel being secured to a short axle carried by upwardly extending members 34, which are in turn welded or otherwise secured to a cross member 35. The cross member 35 has secured thereto, adjacent its opposite ends, upwardly extending post members 37 which project through openings in vertically spaced guiding collars 38 that are secured to appropriate cross member 22 of the frame structure 1. Raising and lowering the cross member 35 together with the auxiliary wheels 19 is shown obtained by a single hydraulic cylinder 40 secured to suitable portions of the frame structure 1. The piston rod 41 of the cylinder 40 is secured adjacent its lower end to the cross member 35 by a pin 42, so that as the piston of the cylinder 40 moves up and down under the influence of hydraulic pressure the cross member and the auxiliary wheels are raised and lowered. The means for supplying hydraulic pressure to the cylinder 40 will be hereinafter described in connection with the means for vertically moving the magnet, as it forms a part of that means.

The spaced means 3 for coupling the device with a truck bumper adjacent opposite ends thereof are similar to each other and a description of one will suffice for both. As shown (Figs. 1, 2, 5, 6) the coupling means comprises a pair of plate members 45 with apertures 46 therethrough that may extend along opposite surfaces of the side frame members 20 and 21 and be held in position by cross pins 47 which extend through an aperture of a row disposed adjacent rear edges of the said side frames. The particular opening through which the pin or bolt 47 projects may be selected in accordance with the height of the truck bumper. Of course a plurality of pins 47 may be used to connect the spaced side plates with the side frames of the device.

Figure 5:
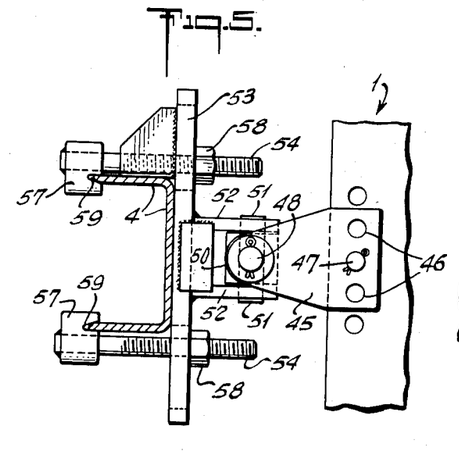
Fig. 5 is a side view of means for coupling the present mobile magnet to the front bumper of a vehicle.
Figure 6:
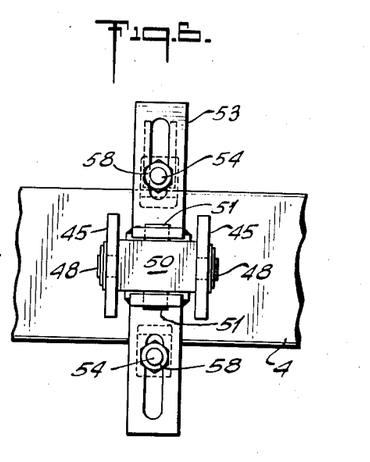
Fig. 6 is a front view of the means illustrated in Fig. 5.

Outwardly spaced ends of the plate members 45 are apertured and fit over lugs 48 of a swivel member 50. The plates 45 are free to move vertically, in response to up and down movement of the frame structure 1 during travel over the ground. The swivel member 50 also has vertically extending lugs 51 which project into openings in vertically spaced flanges 52 of connecting plate 53. The connecting plate 53 is provided with apertures for containing attachment bolts 54 that have clamping lugs 57 secured to their end portions. The clamping lugs 57 have slots or openings 59 to receive portions of the vehicle bumper 4. Nuts 58 may be used to pull the bolts 54 forward and thereby lock the connecting plates 53 against the bumper. The connecting plates 53 and their parts may rotate about a vertical axis due to the vertically disposed lugs 51, so as to turn into optimum seating arrangement with respect to the bumper 4.

The magnetic means comprises the elongated casing 7 which contains a plurality of electro-magnets 66 disposed in adjacent relationship along its length. As shown, each electro-magnet includes a central steel core 66a, about six inches in diameter within a coil 66b and is suspended by bolting to the upper part of the casing 7. The lower ends of the cores 66a may be joined together by a steel bar 66c bolted to them and the underside of the bar may contact the bottom steel plate 11. If desired the bar 66c may be bolted to the bottom plate 11 to thereby hold the magnets firmly in position. Current may be supplied to the magnet windings 66b from the power supply cables 13 which extend to a junction box 68 mounted on any convenient portion of the frame 1. The magnet coils 66b are preferably connected in parallel with each other by leads (not shown) and these leads connect with the junction box 68 to receive current from the cables 13. End portions of the casing 7 may be closed by end plates 9 bolted thereto.

Figure 7:
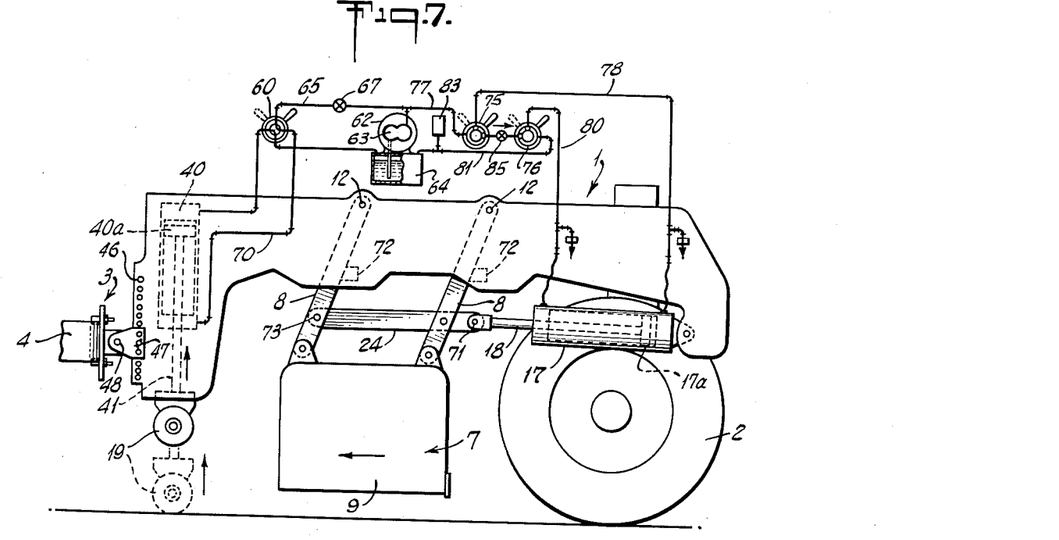
Fig. 7 is a diagrammatic side view showing the present invention in combination with means for changing the position of the magnet and part of its supporting structure.

The entire magnetic means is carried by depending arms 8 which are rotatably connected with the side frames 20 and 21 by pins 12. For convenience, the magnetic means is carried by a pair of the arms 8 at each of the side frames 20 and 21. The supporting arms may rotate or swing to and fro along the side frames 20 and 21. In Figs. 1 and 7 the magnetic means is shown in its lowered operating position with its undersurface located close to the surface of the ground. The spacing from the ground will usually be in the neighborhood of four or five inches and when the magnets 66 are energized and moved over the ground magnetic objects will be lifted up into contact with the undersurface of the bottom plate 11. At convenient intervals the device may be pushed to a dumping location and de-energized so as to release accumulated objects.

Figure 8:
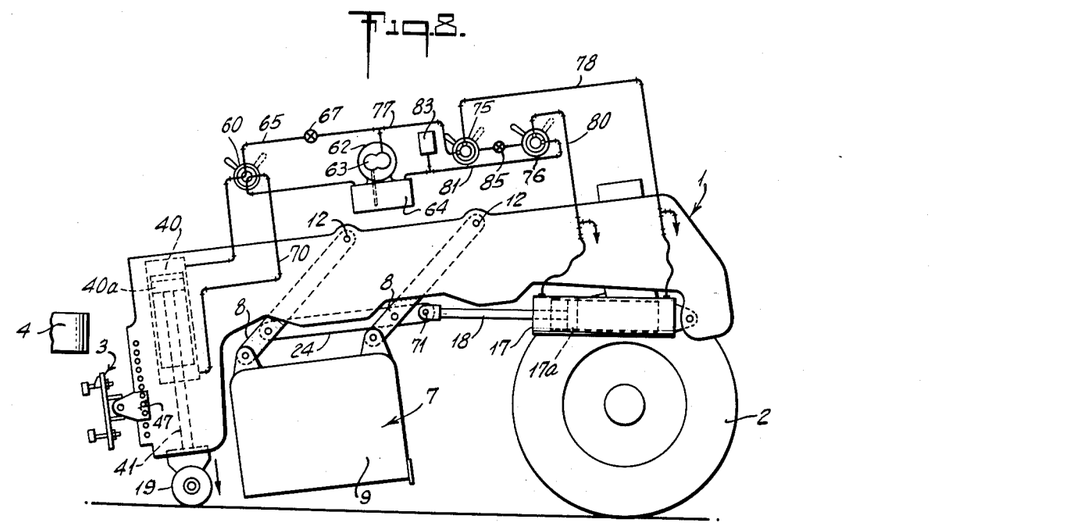
Fig. 8 is a view generally similar to that of Fig. 7 but showing the parts in a different relationship.

When the present device is not being used for "sweeping," for example when being transferred from one location of use to another location, the casing 7 may be raised to inactive position such as that indicated in Fig. 8 and by the dotted line position of Fig. 1. The means for raising the magnet to this position, as well as for lowering it, may comprise the hydraulic cylinders 17 shown rotatably connected with the side frames by pins 69. The piston rods 18 of these cylinders are rotatably secured to connecting members 24 by pins 71 and these connecting members are in turn rotatably attached to the supporting arms 8 by pins 73. When the piston rods 18 and connecting members 24 are moved to the left (Figs. 1 and 7) the depending arms 8 are swung counterclockwise about their supports 12 and the magnet is lifted away from the ground.

While the magnetic means 7 may be of any suitable length it is preferably sufficiently long to project laterally beyond the wheels 10 of the pusher vehicle to sweep a maximum area and to pick up objects in advance of the truck wheels 10 and thereby minimize the possibility of damaging the truck tires.

A hydraulic system for raising and lowering the magnetic means 7 and the auxiliary supporting wheels 19 is shown more particularly in the somewhat diagrammatic views of Figs. 7 and 8. Fig. 7 shows the device in its operating position attached to a front bumper 4 and Fig. 8 shows the device as it may rest on the ground prior to moving the auxiliary supporting wheels 19 to raise the frame to bumper connecting position.

Assume it is desired to raise the rear end of the device from the ground (Fig. 7) to a position for connecting with the adjacent bumper 4. To raise the rear end it is necessary to force the piston 40a downwardly in its cylinder 40. To achieve this the handle of the four-way valve 60 is placed in the position shown by the solid lines, in which an inlet port of the valve connects with the upper end of the cylinder 40 so that liquid may be supplied thereto by electric motor 62 which operates the gear type fluid pump 63 to pick up fluid from a reservoir 64 and delivers it through conduits 65 and opened stop valve 67.

With the four-way valve 60 in the relationship shown by the solid lines of Fig. 8, the opposite end of the cylinder 40 connects through conduit 70 with the fluid reservoir 64, so that as the piston 40a moves down fluid leaves the outlet side of the cylinder through conduit 70 and is forced into the reservoir 64.

When the frame has been raised sufficiently high that the attachment coupling is adjacent the truck bumper 4 the stop valve 67 may be turned to closed position so as to block entry of additional fluid into the cylinder 40 and to prevent fluid from being forced out of the cylinder due to the weight of the device which is supported by the fluid now in the upper portion of the cylinder.

After the device has been coupled to a truck the auxiliary wheels 19 are preferably lifted away from the ground and the rear portion of the device is then carried on the truck bumper. To raise these wheels the four-way valve is turned to the position indicated by the solid lines in Fig. 7 and the stop valve 67 is turned to open position. In this relationship the pump 63 may deliver liquid through the conduits 65 and 70 to the underside of the piston 40a so as to raise it. Oil forced out of the upper part of the cylinders 40 passes through the illustrated conduit to the fluid reservoir 64. When the auxiliary wheels 19 are in raised position the stop valve 67 may be closed so as to hold the liquid against leakage out of the lower part of the cylinder 40.

In lowered position the magnetic means 7 may be held in position by cross bars or pins 72 which hold the supporting arms 8 against further downward swinging. To swing the arms clockwise about their supports 12 and raise the magnetic means 7, fluid is supplied to the right side of the hydraulic cylinders 17 so as to move their pistons 17a to the left and thereby project their piston rods 18 and connecting members 25 toward the left. To achieve this movement the three-way valves 75 and 76 are positioned as shown by the solid lines of Fig. 8 and in this relationship fluid may be pumped by the pump 63 to the right side of the pistons 17a through conduit 77, valve 75 and conduit 78. Fluid forced out of the cylinder at the opposite side of the pistons 17a may flow out through conduit 80, valve 76 and conduit 81 into the reservoir 64. An accumulator chamber 83 may be connected by a conduit with the system to accommodate expansion of liquid in the system and to act as a sort of surge chamber.

When the magnetic means 7 is in desired raised position the handle of valve 75 may be turned to the dotted position so as to block the conduit 78 against flow of liquid thereinto. When it is desired to lower the magnet 7 the valve 76 may be shifted to the dotted position of Fig. 8 (solid position of Fig. 7) and in this relationship liquid may flow from the right side of the cylinder 17 through condut 78, through valve 75 (which is now in the dotted position) through the check or restriction valve 85, through the valve 76 and into the space at the left side of the pistons 17a; the weight of the magnet normally tends to pull the depending arms 8 toward vertical position and hence to move the connecting members 24 and piston rods 18 toward the right end of the cylinders 17.

Good results may be obtained by using a gear pump 63 having a capacity of one and one-half gallons per minute at 175 pounds per square inch, a reservoir 64 with capacity of about six gallons, having about a six inch internal diameter with stroke of seventeen inches, and magnet lifting cylinders of about six inch internal diameter and twelve inch stroke. These are merely examples and any other suitable ones may be employed.

Figure 9:
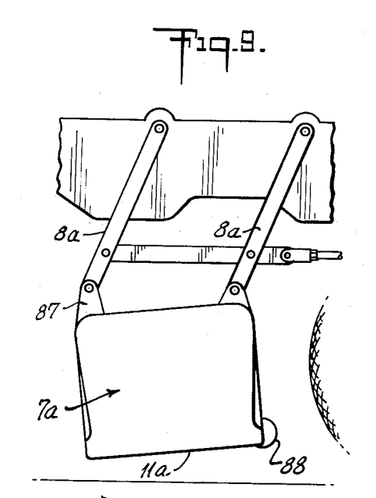
Fig. 9 is a side elevational view showing the preferred form of the invention for actual use.
Figure 10:
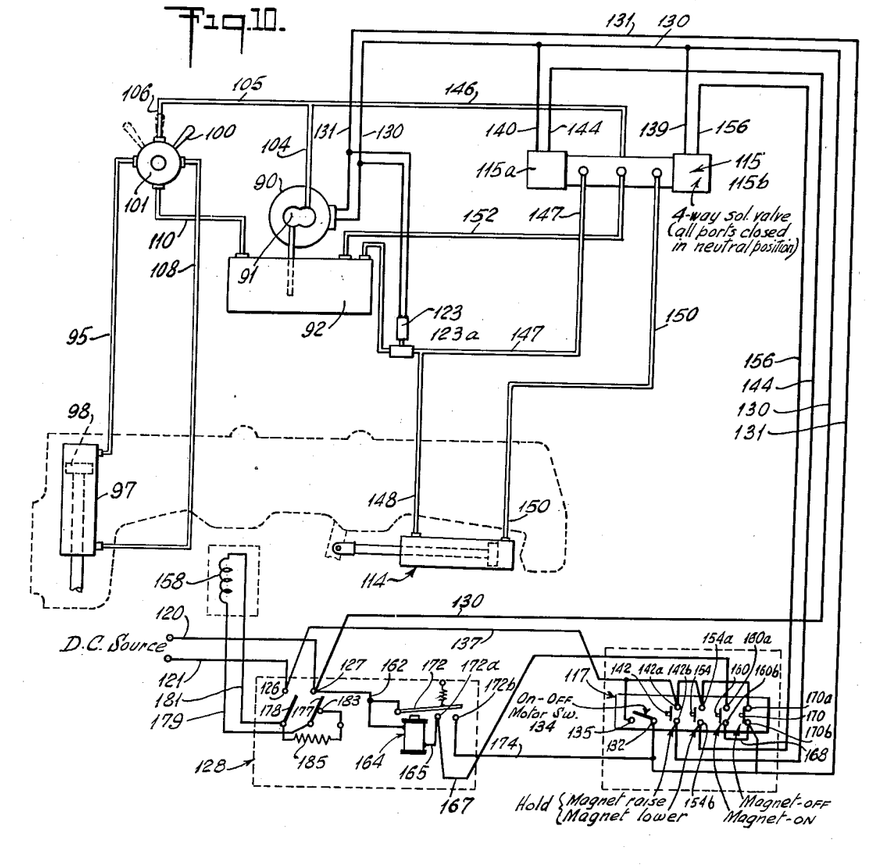
Fig. 10 is a diagrammatic view showing a hydraulic and electrical control system for use with the preferred form of Fig. 9.

The preferred form of magnetic sweeper for actual use is shown in Fig. 9 and the preferred hydraulic and electrical control system for it is shown more or less diagrammatically in Fig. 10.

As shown in Fig. 9 the magnet casing 7a is supported so that its undersurface 11a is inclined to the ground to facilitate picking up elongated magnetic articles without digging them into the ground. With the undersurface of the magnet disposed generally as shown in Fig. 9, an article such as an iron bar which may lie on the ground in a direction generally parallel to the direction of movement of the device over the ground, will normally not be picked up adjacent the leading edge of the magnet but will be lifted toward the magnet after a substantial portion of the magnet has passed over the iron bar. That is, the iron bar can get further back under the inclined magnet before being picked up than is the case where the undersurface of the magnet is parallel to the ground. In the latter instance there is a tendency to pick up one end of the metal bar at the leading edge of the magnet undersurface, which tends to push forward on the iron bar and dig its front end into the ground as the magnet continues to move forward. The improved action by having the magnet undersurface inclined rearwardly as shown in Fig. 9 is of course true with similar metal objects as well as elongated ones, in that they pass under the magnet and are picked up adjacent a central portion of its undersurface where the field is strongest, rather than at its front edge.

While any suitable means may be utilized for supporting the magnet casing 7a so that its undersurface is inclined to the ground, a relatively simple expedient is provided by utilizing rear attachment lugs 87 which are longer than the attachment lugs at the front part of the casing. This puts the rear or trailing edge of the magnet closer to the ground and inclines its undersurface. If desired the supporting arms 8a can be of different lengths.

The front lower edge of the magnet casing preferably has secured thereto a half-round member 88 which serves to protect the front lower edge of the magnet and also tends to direct articles toward the holding undersurface 11a.

The preferred form of the invention shown in Fig. 9 is controlled from the truck cab by means of a push button station. This station may comprise a casing of suitable size for holding various switches and contacts to control energization and de-energization of the magnet and to control raising and lowering of it. As with the previously described embodiment, raising and lowering of the auxiliary supporting wheels at the rear of the frame is controlled by a valve on the frame work of the magnet.

As shown in Fig. 10, a direct current motor 90 operates a pump 91 to supply hydraulic fluid to the various parts of the hydraulic system from a tank 92. When the motor and pump are in operation, hydraulic fluid may be selectively fed, through conduits 95 or 96 to one side or other of the hydraulic cylinder 97 which contains a piston 98 and piston rod for raising or lowering the auxiliary supporting wheels at the rear of the magnet frame.

When the operating handle 100 of 4-way valve 101 is in the solid right hand position fluid passes from the hydraulic pump 91 through conduits 104, 105, 106, suitable passages in the valve 100 (not shown) to the line 108 and from there into the lower portion of the hydraulic cylinder 97 so as to raise the auxiliary supporting wheels (not shown). Fluid at the upper end of the cylinder 97 is forced out through conduit 95, and suitable passage in the valve 101, which connects with conduit 110; the fluid passes from this conduit 110 into the tank 92.

When the operating handle 100 is swung to the dotted line position shown at the left of Fig. 10, fluid is forced into the upper end of the hydraulic cylinder through conduits 105, 106 and 95 and a passageway in valve 101 which now connects conduits 106 and 95; fluid is forced out the lower part of the piston to the tank 92 through the conduits 108 and 110 and a connecting passageway in valve 101. The operating handle 100 may be set in a neutral mid-position intermediate the right and left positions when it is desired to retain a particular position of the piston 98 and the auxiliary supporting wheels which are raised and lowered thereby.

The passage of hydraulic fluid to one side or other of the hydraulic cylinder 114 which is employed for raising or lowering the magnet is controlled by means of a commercially available 4-way solenoid valve 115, shown diagrammatically, which is operated from switch buttons carried by the control box or casing 117 which is normally located inside the truck cab. Direct current power lines 120 and 121 lead from the motor generator set, carried by the truck, to the control box 117 and control wires led from this control box to the solenoid valve 115, pump motor 90 and an additional normally open solenoid valve 123. In addition to being provided with control buttons for operating the solenoid valves and pump motor, the control box 117 also carries switch buttons for turning the magnet on and off. This electrical system will now be described. Valve 115 is of known construction.

As shown, the direct current power lines 120 and 121 connect with terminals 126 and 127 of any type of commercially available electrically operated field discharge switch 128. The power line 120 connects with and supplies current to the pump motor 90 through the lead 130, and a return line 131 connects the pump motor with motor switch contact 132 of the control box 117. When the manually operated motor switch arm 134 is closed against the contact 135, current passes from the return lead 131 to line 137, to the contact 126 of field discharge switch 128 and from there to the return power line 121. Thus the on-off switch 134 of the control box 117 controls operation of the pump motor 90.

When the motor switch 134 is closed, current is also supplied from the line 130 to the leads 139 and 140 of the solenoid valve 115. When the hold-down contact 142 of the control box 117 is pressed and held against its contacts 142a and 142b current from lead 140 may pass through one of the solenoids of the valve 115 and out through return lead 144 to terminal 142b, across contact element 142 to terminal 142a, and thence to terminal 135 and return lead 137 which connects with return power line 121.

In this relationship the solenoid 115a of the valve 115 which is connected with the leads 140 and 144 actuates the valve 115 to establish a hydraulic connection for raising the magnet by supplying hydraulic fluid to the right side of hydraulic cylinder 114. When the pump motor 90 is in operation, by closing the contact arm or switch button 134 as previously described, fluid is pumped to the right end of the hydraulic cylinder through conduits 104, 146, through the valve 115 to conduit 150. This raises the magnet. Fluid passes out of the left end of the hydraulic cylinder 114 through conduits 148 and 147, through a conduit established in the valve 115 by operation of the solenoid 115a which connects with the leads 140 and 144, and through conduit 152 to the tank 92.

The switch 142 is of the "hold-down" type and when it is released the solenoid 115a is de-energized and raising of the magnet stops.

In order to lower the magnet, by supplying hydraulic fluid to the left end of cylinder 114, push button 154 is pushed and held down so as to close the gap across contacts 154a and 154b. In this relationship current passes to the solenoid 115b from supply lead 130 and supply line 139, and returns via lead 156, terminal 154b, push button contact 154, terminal 154a, which connects with terminal 135 and return line 137. With the lowering push button 154 closed, a conduit is established between the hydraulic conduit 146 and conduit 147 so that fluid from the pump 90 may flow to the left end of the hydraulic cylinder. Fluid leaves the right end of the cylinder through conduit 150, a valve conduit established by operation of the solenoid 115b, and conduit 152 which conveys the fluid back to the tank 92. Here again the lowering switch 154 is of the type which must be held down. When released, connection across the terminals 154a and 154b is broken and lowering of the magnet ceases.

The valve 123a, which is operated by the solenoid 123 is normally open. That is, when the present magnetic sweeper is travelling over the ground the pump motor 90 is normally at rest and the valve 123a is open. In this relationship if the magnet casing should strike an obstruction and be forced rearwardly, fluid at the left side of hydraulic cylinder 114 may pass out thereof through conduit 148 and the open valve 123a and flow back into the tank 92, thus by-passing the closed solenoid valve 115. When the pump motor 90 is in operation, as hereinabove described, the solenoid 123 is operated so as to effect closing of the valve 123a; in this relationship fluid is controlled so as to pass to one side or the other of the hydraulic cylinder piston, instead of escaping through the valve 123a to the tank 92.

Energization and de-energization of the magnet 158 is as follows. When the magnet "on" button 160 is momentarily pressed down so as to close the connection across its terminals 160a and 160b current flows from the power line 120 through terminal 127, lead 162, solenoid or pull-in coil 164, lead 165, lead 167 to terminal 160a, across the contact arm of button 160 to terminal 160b, through lead 168 to terminal 170b across the magnet "off" contact bar 170 to terminal 170a, and thence to return lead 137 which connects with return power line 121. This momentary contact of the magnet "on" button and energization of the pull-in coil 164 causes the latter coil to close the contact bar 172 across terminals 172a and 172b, so that current may flow from the lead 162 to lead 174, to terminal 170b and across contact bar 170 to terminal 170a, from which it finds its way back to the return lead 137. Thus momentary contact of the magnet "on" switch and its energization of the pull-in coil causes the auxiliary switch 172a to close and establish a circuit which keeps the pull-in coil energized.

The pull-in coil 164 also closes the main detector switch of the field discharge switch 128 and holds this main switch closed until the pull-in coil is de-energized by pushing the magnet "off" switch 170. The main detector switch is shown open in Fig. 10, with its contact arms 177 and 178 spaced from the terminals 127 and 126, respectively. When the coil 164 is energized it closes these arms against their terminals 127 and 126 so that current may flow from the power line 120 across contact arm 177 to lead 179 through the coils 158 of the magnet, through return lead 181 and across contact arm 178 to return power line 121.

When it is desired to shut off the magnet 158, the magnet "off" button 170, which is normally closed, is pushed and this interrupts the connection across the terminals 170a and 170b. As a result the current through the pull-in coil 164 is interrupted and the coil allows the auxiliary contact arm 172 to move away from its terminals 172a and 172b. At the same time the contact arms 177 and 178 of the main detector switch move away from the terminals 127 and 126 so as to cut off the power supply from the power lines 120 and 121.

In the open position, the arm 177 comes into contact with the terminal 183 and connects with a resistance 185. This feature minimizes or prevents arcing due to cutting off the magnet, in accordance with the usual commercial practice. The field discharge switch 128 is, as previously mentioned an item of standard commercial construction.

It will be seen that the present invention provides new and improved means adapted to be pushed in front of a truck or other vehicle to magnetically pick up ferrous objects from roads, aircraft runways or any other surface. The device is of relatively simple and rugged construction and by pushing it ahead of the power unit is adapted to prevent puncturing pneumatic tires of the propelling vehicle. The supporting wheel for the mobile magnet is centrally disposed so that it travels along a narrow zone and hence the danger of puncturing the tires which support the device is minimized. The front wheel supporting means is of the caster type and may readily swivel about a generally upright axis in accordance with turning and other movement of the device and its propelling vehicle over the ground.

The magnetic means which picks up objects is carried by relatively simple means which may be operated to readily change the elevation of the magnet. In the event a front portion of the magnet should strike against a bump or other relatively heavy object during its movement over the ground the magnet may move rearwardly so as to prevent tearing it loose from the device or otherwise damaging it.

The undersurface of the magnet, in the preferred form of the invention, is inclined to the ground so it may move well over objects before picking them up. This minimizes the possibility of elongated objects being lifted at only one end and pushed forward so that an opposite end digs into the ground, which may damage or interfere with operation of the device.

Hydraulic means is provided for readily shifting the position of the magnet, and for raising and lowering the rear end of the device to align with the bumper or other portion of a vehicle to which it is desired to attach the device. In the preferred form of the invention means is provided for turning the magnet on or off from inside the vehicle cab and for raising or lowering it from the same location.

The hydraulic operating means may comprise a single electric motor and pump connected with the hydraulic cylinder for varying position of the magnet and with the hydraulic cylinder for varying the height of auxiliary supporting wheels, which latter are normally utilized to support the rear end of the device when it is not in use for picking up objects.

The motor generator set for supplying power to the magnetic means may be carried on the truck which pushes the vehicle and hence the device itself may be of relatively light but sturdy construction.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A device of the class described comprising the combination of a frame, wheel means supporting said frame adjacent one end thereof for movement over the ground, additional wheel means adjacent an opposite end of said frame adapted to support said end, at least a single arm connected with and depending from a portion of said frame, magnetic means carried by said arm, means for moving said arm to vary the spacing of said magnetic means from the ground, and means for selectively moving said additional wheel means toward and away from the frame.

2. A device as claimed in claim 1, in which said means for selectively moving the additional wheel means comprises a hydraulically operated cylinder having a piston rod thereof operatively connected with the additional wheel means.

3. A pusher type magnetic road sweeper comprising the combination of a frame, wheel means supporting said frame adjacent one end thereof for movement over the ground, additional wheel means adjacent an opposite end of said frame adapted to support said end, at least a single arm connected with and depending from a portion of said frame, magnetic means carried by said arm, hydraulically operated means operatively connected with said arm for moving said arm to vary the spacing of said magnetic means from the ground and operatively connected with said additional wheel means for selectively moving said additional wheel means toward and away from the frame.

4. A sweeper as claimed in claim 3, in which said hydraulically operated means includes a single electric motor and pump mounted on said frame.

5. A sweeper as claimed in claim 3, in which said magnetic means comprises an electro-magnet, in which said hydraulically operated means includes an electric motor and a pump carried by said frame, and in which said electro-magnet and electric motor are energized from a common source.

6. A pusher type magnetic road sweeper comprising the combination of a frame, freely rotatable support means carried by said frame adjacent a front end thereof, vertically movable support means carried by the frame adjacent a rear end thereof, means carried by said frame to vertically move the latter support means, magnetic means carried by said frame and disposed generally crosswise thereof intermediate the front and rear support means, and coupling means secured to and projecting rearwardly from the rear end of said frame for coupling the frame to the front of a vehicle.

7. A device as claimed in claim 6 in which said coupling means includes a generally horizontally disposed pin and members with cooperating sockets for selectively receiving the pin, to thereby facilitate vertical movement of the sweeper during pushing over the ground.

8. A device as claimed in claim 7, in which said frame is provided with a plurality of generally vertically disposed apertures adjacent its rear end and said coupling means includes a pin to project through said apertures and selectively connect the coupling with the frame.

9. A device as claimed in claim 3 in which said hydraulically operated means connected with said arm includes a cylinder member having a piston therein and a piston rod member projecting therefrom with one of said members being operatively secured to a portion of said frame and the other to a portion of said arm.

10. A device as claimed in claim 3 in which said additional wheel means comprises a pair of support members horizontally spaced from each other and connected together by a crossbar and in which said hydraulically operated means connected to said additional wheel means comprises a piston and a piston rod for vertically moving said crossbar.

11. A pusher type magnetic sweeper for attachment to and partial support by the front of a wheeled vehicle comprising the combination of a frame, a shaft rotatably mounted in a generally vertical position on said frame adjacent its front end having wheel means on its lower portion for providing rolling contact with the ground, said shaft having its axis of rotation spaced forwardly of the normal ground contacting location of the wheel means, coupling means on said frame adjacent the rear end thereof having a width sufficient to connect the sweeper to laterally spaced points on the front of the wheeled vehicle whereby the wheeled vehicle supports the rear end of the frame and guides the sweeper and constitutes the sole means in addition to said wheel means for supporting the frame, magnet support means on said frame intermediate said shaft and said coupling means for supporting and positioning a magnet beneath the frame, and a magnet mounted on said support means.

References Cited in the file of this patent
UNITED STATES PATENTS

| | | |
|---|---|---|
| 931,885 | Powell et al. | Aug. 24, 1909 |
| 1,326,559 | Ady | Dec. 30, 1919 |
| 1,745,970 | Andrew | Feb. 4, 1930 |
| 1,759,687 | Carter | May 20, 1930 |
| 1,961,336 | Close | June 5, 1934 |
| 2,064,022 | Maloon | Dec. 15, 1936 |
| 2,127,405 | Hall | Aug. 16, 1938 |
| 2,140,264 | Kingham | Dec. 13, 1938 |
| 2,348,445 | Bayer | May 9, 1944 |
| 2,486,409 | Holmes | Nov. 1, 1949 |
| 2,572,409 | Van Doorne | Oct. 23, 1951 |
| 2,612,385 | Peltz | Sept. 30, 1952 |
| 2,629,495 | Smale | Feb. 24, 1953 |